Patented June 30, 1953

2,643,995

UNITED STATES PATENT OFFICE 2,643,995

EMULSION POLYMERIZATION PROCESS

Harold F. Park, East Longmeadow, Mass., assignor to Monsanto Chemical Company, St. Louis, Mo., a corporation of Delaware No Drawing. Application March 25, 1949, Serial No. 83,521

6 Claims. (Cl. 260—93.5)

This invention relates to the polymerization and copolymerization of vinyl aromatic compounds in aqueous emulsion. More particularly, the invention relates to improvements in the methods for providing emulsion polymers and copolymers of vinyl aromatic compounds.

One of the widely used methods for obtaining polymers and copolymers of vinyl aromatic compounds is polymerization in aqueous emulsion using various emulsifying agents, polymerization catalysts, polymerization accelerators, sometimes considered as catalyst activators, modifiers, buffers, etc. Each of the various materials added to improve the emulsion polymerization process increases the impurity of the product and is deleterious to the physical properties of the polymers. For example, inorganic salts may decrease the electrical resistance and increase the moisture absorption of the polymers; the residue left with many of the catalysts causes yellowing of the polymer on ageing, etc.

It is an object of this invention to provide relatively pure polymers and copolymers of vinyl aromatic compounds.

A further object is to provide pure polymers and copolymers by an emulsion polymerization process. Another object of this invention is to provide a process for the polymerization and copolymerization of vinyl aromatic compounds in aqueous emulsion using a minimum of polymerization aids.

Still another object is to provide a process for preparing aqueous emulsions of vinyl aromatic polymers and copolymers which emulsions may be dried without coagulation and the dried products used as molding powders.

These and other objects are attained by polymerizing and copolymerizing vinyl aromatic compounds in aqueous emulsion using hydrogen peroxide as the polymerization catalyst, an aliphatic alcohol as polymerization accelerator or catalyst activator and an alkali metal or alkaline earth metal salt of an aliphatic substituted aromatic sulfonic acid as the emulsifying agent.

The following examples are given in illustration and are not intended as limitations upon the scope of this invention. Where parts are mentioned, they are parts by weight.

Example I

A solution was prepared by adding 1.2 parts of dodecyl benzene sodium sulfonate to 1000 parts of water. The solution was heated to boiling and then 6 parts of ethyl alcohol and .8 part of a 30% aqueous solution of hydrogen peroxide were added. To this solution, 390 parts of monomeric styrene were added with constant agitation. The mixture was heated at reflux temperature and atmospheric pressure for about 90 minutes with continuous agitation. The product was an aqueous emulsion of polystyrene. This emulsion was dried by heating it in an oven at about 100° C. and then the dried polystyrene was molded by compression molding process into a disk two inches in diameter and about .125 inch in thickness. The disk was as clear as crystal showing no haze and no discoloration. When the disk was immersed in boiling water for a substantial time it remained clear and completely unaffected by the heating or the water.

Example II

Example I was repeated except that a standard catalyst, potassium persulfate, and a standard polymerization accelerator, sodium bicarbonate, were substituted, respectively, for the hydrogen peroxide and the ethyl alcohol of Example I. The emulsion obtained was dried in an oven at about 100° C. and the dried resin was molded into a disc two inches in diameter and .125 inch in thickness. When this disk was subjected to boiling water it became white and opaque and soon began to lose its shape.

Example III

A solution of 3.2 parts of the sodium salt of a mixture of naphthenic sulfonic acids in 1000 parts of water was heated to reflux temperature. To the hot solution were added 2.8 parts of a 30% hydrogen peroxide solution and 6 parts of ethyl alcohol. 360 parts of styrene monomer were added to the solution with constant agitation over a period of about 30 minutes. The resultant mixture was heated at reflux temperature and atmospheric pressure for about 75 minutes under constant agitation. The resulting emulsion of polystyrene was dried on heated drums and the resin recovered was injection molded. The injection molded pieces were uncolored, contained no haze and were resistant to boiling water. Furthermore, the electrical resistance of the molded objects was substantially the same as similar objects molded from polystyrene obtained by the conventional mass polymerization process.

Example IV

A solution of 4 parts of cetyl benzene sodium sulfonate in 1000 parts of water was heated to reflux temperature. To the hot solution were added 3 parts of a 30% hydrogen peroxide solution and 10 parts of butyl alcohol. Then 500 parts of monomeric styrene were added to the solution with constant agitation over a period of about 25 minutes. The resulting mixture was heated at reflux temperature and atmospheric pressure under constant agitation for about 2 hours. The resultant emulsion could be dried directly to produce a molding powder which could be easily molded by injection or compression molding methods or could be easily extruded in standard extrusion equipment. The objects obtained from this dried resin were crystal-clear, uncolored, resistant to boiling water and had excellent electrical properties.

Example V

A solution was prepared by dissolving 5 parts of docosanyl benzene sodium sulfonate in 1000 parts of water. The solution was brought to boiling and 3 parts of a 30% hydrogen peroxide solution and 6 parts of methanol were added thereto. To this solution were added a mixture of 320 parts of styrene monomer and 80 parts of α-methyl styrene monomer over a period of about 30 minutes with constant agitation. The mixture thus obtained was heated at reflux temperature and atmospheric pressure for about 90 minutes under constant agitation. The product was an aqueous emulsion of polystyrene which could be dried directly in an oven or a drum drier to produce a molding powder. The molding powder could be made into articles which were free from haze and color and which were resistant to boiling water.

The essence of this invention is the use of hydrogen peroxide as polymerization catalyst, an alcohol as polymerization accelerator and a specific type of emulsifying agent.

Hydrogen peroxide is the only oxygen-yielding polymerization catalyst which will give the improved products of this invention. It does not cause discoloration of the polymer during the polymerization process and it leaves no residue in the polymer after the drying procedure to cause discoloration on ageing. However, it is not possible to use any desired amount of hydrogen peroxide to catalyze this process since a particular material balance must be maintained throughout the process in order to obtain favorable results. The amount of hydrogen peroxide which may be used to obtain the particular polymers and copolymers of this invention may be varied between the limits of 0.05 to 0.8 part per 100 parts of polymerizable monomer or monomeric mixture. If less than .05 part is used the polymerization reaction will be too slow and the products obtained will not be useful as molding powders. If more than .8 part is used polymerization will be too rapid and the balance between the emulsifying agent and polymerization accelerator will be destroyed so that the polymers precipitate instead of staying in the emulsion.

The emulsifying agents which may be used in the process of this invention are restricted to the alkali metal and alkaline earth metal salts of aromatic monosulfonic acids having one substituent on the aromatic ring which is aliphatic in character and which contains from 12 to 22 carbon atoms. Other well known emulsifying agents are not applicable to this invention since they do not cooperate with the alcohol and hydrogen peroxide to form a stable emulsion under the conditions used. Whereas, any alkali metal or alkaline earth metal such as sodium, potassium, rubidium, cesium, lithium, calcium, strontium, or barium may be used to produce the sulfonic acid salt, for commercial reasons it is usually preferable to use the sodium salt. Among the aromatic monosulfonic acids which may be used are dodecyl benzene sulfonic acid, tetradecyl benzene sulfonic acid, hexadecyl benzene sulfonic acid, cetyl benzene sulfonic acid, stearyl benzene sulfonic acid, octadecyl benzene sulfonic acid, nonadecyl benzene sulfonic acid, eicosyl benzene sulfonic acid, docosanyl benzene sulfonic acid, and similar compounds made by using naphthalene or anthracene instead of benzene. The amount of emulsifying agent must be restricted to from 0.05 to 0.5 part per 100 parts of monomer or monomer mixture. More than 0.5 part will seriously reduce the moisture and electrical resistivity of the polymer and increase the haze content of objects molded from the polymer, less than 0.05 part will be insufficient to emulsify the polymerization medium.

The operation and properties of octadecyl benzene sodium sulfonate as an emulsifying agent in aqueous emulsion polymerization is described and claimed in copending application S. N. 90,552 filed April 29, 1949, in the name of Harold F. Park and Gaston P. Du Bois.

Aliphatic alcohols, as a class, have been found to be excellent polymerization accelerators or catalyst activators. The alcohols may be primary, secondary or tertiary. Alcohols containing from 1–20 carbon atoms have been found to accelerate the polymerization reaction including; methyl alcohol, ethyl alcohol, propyl alcohol, isopropyl alcohol, n-butyl alcohol, tertiary butyl alcohol, lauryl alcohol, cetyl alcohol, stearyl alcohol, eicosyl alcohol, etc. The amount of alcohol which may be used should be at least 0.5 part per 100 parts of monomer or monomer mixture. There is apparently no upper limit as to the amount of alcohol which may be used as far as a smooth polymerization process is concerned. However, when the amount of alcohol is increased to above 2 parts per 100 parts of monomer or monomer mixture, the effect of the added amount does not increase in proportion to the amount added and for economic reasons 2 parts becomes the top limit.

The process of this invention is applicable to the emulsion polymerization of vinyl aromatic compounds which are substantially insoluble in water. Among such compounds are vinyl benzene, vinyl naphthalene, vinyl anthracene, divinyl benzene, trivinyl benzene, divinyl naphthalene, etc.; the ring-substituted derivatives of the above-named compounds including o-, m-, and p-alkyl styrenes such as methyl, ethyl, propyl, butyl, isobutyl, octyl, lauryl styrenes, o,p-dimethyl styrene and similar derivatives of vinyl naphthalene and vinyl anthracene; o-, m- or p-halostyrenes such as o-, m- or p-chlorostyrene, fluorostyrene, bromostyrene, iodostyrene, paraphenylstyrene and the corresponding vinyl naphthalene derivatives; vinyl aromatic compounds in which the alpha position of the vinyl group is substituted by an alkyl or aryl group such as α-ethyl styrene, α-methyl styrene, α-isopropyl styrene, α-phenyl styrene, α-methyl vinyl naphthalene, etc. Two or more of these vinyl aromatic compounds may be copolymerized or the vinyl aromatic compounds may be copolymerized with other polymerizable monomeric compounds which are substantially insoluble in water such as acrylic esters including methyl acrylate, ethyl acrylate, phenyl acrylate, etc.; α-substituted acrylic acid esters such as methyl methacrylate, ethyl methacrylate, butyl methacrylate, butyl ethacrylate, propyl phenacrylate; nitriles of acrylic and substituted acrylic acids such as acrylonitrile, ethacrylonitrile, methacrylonitrile; allyl esters such as allyl acetate, allyl propionate, allyl butyrate, etc.; esters of α-β unsaturated dibasic acids such as the di-esters of maleic acid, fumaric acid, citraconic acid, itaconic acid, mesaconic acid, etc. including dimethyl fumarate, diethyl maleate, dicyclohexyl itaconate, etc. In case the copolymer is prepared with one or more of the monomers which are not vinyl aromatic compounds the vinyl aromatic component must be at least 50% by weight of the total monomer content and preferably is 85% by weight.

The process of this invention should be carried out in a definite order. For best results the emulsifying agent is first dissolved in water and the solution is heated to reflux temperature to remove oxygen therefrom. The alcohol and catalyst is next added to the hot solution after which the monomer or monomeric mixture is added to the hot solution with constant agitation over a period of time varying between 10 and 45 minutes. In the event that a plurality of monomers is used it is necessary to mix the monomers prior to addition to the polymerization medium, the mixture being made up in the exact proportions desired in the final product. After all of the monomer has been added to the polymerizing medium, said medium is preferably maintained at reflux temperature and atmospheric pressure for from one to three hours. If desired, the temperature may be reduced to about 30° C. below the reflux temperature with a consequent extension of the polymerization time.

Various conventional additives and modifiers may be added during the emulsion polymerization process or after the emulsion of the polymer is obtained. Among such additives are dyes, pigments, lubricants, plasticizers, and sulfur-containing modifiers such as the mercaptans and the xanthates.

The emulsions produced by the process of this invention may be and preferably are resolved by direct drying methods such as oven drying, drum drying, etc. During the drying period the alcohol volatilizes and any residual hydrogen peroxide is broken down and removed leaving as the only impurity in the resin an inconsequential amount of a type of emulsifier which does not adversely affect the electrical and moisture resistance of the resin nor cause any haze to develop therein.

If desired, the emulsions may be used to prepare films by casting processes. Such films are unusually clear and are substantially moisture resistant.

By using the process of this invention it is possible to obtain polymers and copolymers of vinyl aromatic compounds which are far superior to similar polymers and copolymers prepared by standard emulsion polymerization processes and which are substantially the same as similar polymers and copolymers made by mass polymerization methods. There is no necessity for coagulating the emulsions and washing the coagulates to remove detrimental impurities. The resins when molded produce articles which are colorless and substantially free from haze. The molded objects may be subjected to boiling water for extended periods of time without softening or turning white. The molded objects also have electrical properties substantially equivalent to the electrical properties of objects molded from polymers prepared by mass polymerization methods.

It is obvious that many variations may be made in the products and processes of this invention without departing from the spirit and scope thereof as defined in the appended claims.

What is claimed is:

1. A process which comprises polymerizing 100 parts of a polymerizable vinyl aromatic compound in aqueous emulsion using from 0.05 to 0.5 part of an emulsifying agent taken from the group consisting of the alkali metal and alkaline earth metal salts of substituted aryl sulfonic acids in which the substituent is an aliphatic group containing from 12 to 22 carbon atoms, at least 0.5 part of an unsubstituted, saturated aliphatic monohydric alcohol containing from 1 to 20 carbon atoms and from 0.05 to 0.8 part of hydrogen peroxide, said process being carried out at temperatures from reflux temperature at atmospheric pressure to 30° C. below said reflux temperature.

2. A process which comprises copolymerizing 100 parts of a mixture of a vinyl aromatic compound with a water-insoluble monomer polymerizable therewith, said mixture comprising at least 85% vinyl aromatic compound by weight, in aqueous emulsion using from 0.05 to 0.5 part of an emulsifying agent taken from the group consisting of the alkali metal and alkaline earth metal salts of substituted aryl sulfonic acids in which the substituent is an aliphatic group containing from 12 to 22 carbon atoms, at least 0.5 part of an unsubstituted, saturated aliphatic monohydric alcohol containing from 1 to 20 carbon atoms and from 0.05 to 0.8 part of hydrogen peroxide, said process being carried out at temperatures from reflux temperature at atmospheric pressure to 30° C. below said reflux temperature.

3. A process as in claim 1 wherein the vinyl aromatic compound is styrene.

4. A process as in claim 3 wherein the emulsifying agent is dodecyl benzene sodium sulfonate.

5. A process as in claim 3 wherein the emulsifying agent is docosanyl benzene sodium sulfonate.

6. A process which comprises polymerizing 100 parts of a vinyl aromatic compound in aqueous emulsion using from 0.05 to 0.5 part of dodecyl benzene sodium sulfonate as an emulsifying agent, at least 0.5 part of ethanol as a polymerization accelerator and from 0.05 to 0.8 part of hydrogen peroxide as a polymerization catalyst, said process being carried out at temperatures from reflux temperature at atmospheric pressure to 30° C. below said reflux temperature.

HAROLD F. PARK.

References Cited in the file of this patent

UNITED STATES PATENTS

| Number | Name | Date |
|---|---|---|
| 2,375,140 | Semon | May 1, 1945 |
| 2,380,476 | Stewart | July 31, 1945 |
| 2,388,167 | Marple | Oct. 30, 1945 |
| 2,388,600 | Collins | Nov. 6, 1945 |
| 2,391,817 | Blackburn | Dec. 25, 1945 |
| 2,470,065 | Barnes | May 10, 1949 |
| 2,485,270 | Folt | Oct. 18, 1949 |
| 2,503,338 | Irany et al. | Apr. 11, 1950 |
| 2,595,892 | Schulze et al. | May 6, 1952 |